United States Patent [19]

Orwin

[11] 3,926,125

[45] Dec. 16, 1975

[54] POWER AND FREE CONVEYOR

[75] Inventor: Olaf John Barclay Orwin, Birmingham, England

[73] Assignee: Redman Fisher Engineering Limited, England

[22] Filed: Feb. 20, 1974

[21] Appl. No.: 444,174

[52] U.S. Cl. .................. 104/94; 104/172 S; 267/34
[51] Int. Cl.² ........................................... B61B 3/00
[58] Field of Search ....... 104/89, 93, 94, 95, 172 R, 104/172 C, 172 S; 267/34

[56] References Cited
UNITED STATES PATENTS

| | | | |
|---|---|---|---|
| 3,426,700 | 2/1969 | Klamp | 104/94 |
| 3,447,797 | 6/1969 | Roberts | 267/34 |
| 3,595,551 | 7/1971 | Ortheil | 267/34 X |
| 3,720,172 | 3/1973 | Dehne | 104/172 S |
| 3,804,394 | 4/1974 | Sivaslian | 267/34 |

Primary Examiner—Robert S. Ward, Jr.
Assistant Examiner—Randolph A. Reese
Attorney, Agent, or Firm—Friedman & Goodman, Esqs.

[57] ABSTRACT

A power and free conveyor wherein each load carrier comprises a plurality of trolleys, the foremost of which has dogs for engaging with driving dogs on the powered conveyor element. The rearmost trolley of each load carrier has control means operative when a following carrier comes into proximity with the rearmost trolley to disengage a driving dog of the following carrier from a driving dog of the powered conveyor element. The rearmost and next adjacent trolleys of each load carrier are connected with one another by a telescopic draft member which can pivot laterally relative to each trolley. The draft member contains a compression spring which absorbs a substantial part of the momentum of the following load carrier when the carriers come into proximity.

7 Claims, 6 Drawing Figures

POWER AND FREE CONVEYOR

BACKGROUND TO THE INVENTION

This invention relates to a conveyor system of the kind including an endless power-advanced conveyor element provided with a plurality of driving dogs spaced apart along the length of the element, a load-supporting track parallel to the path of travel of the conveyor element and a plurality of load carriers which run on the track and have respective dogs engageable with the driving dogs of the conveyor element to transmit drive from the conveyor element to the carriers. The invention is concerned more particularly with a conveyor system of the kind referred to wherein each carrier comprises a plurality of trolleys, the front trolley of the carrier has a driving dog engageable with the driving dog of the conveyor element and the rear trolley of the carrier has a drive control element which discontinues drive from the conveyor element to a following carrier when such following carrier comes into proximity with the trolley having the drive control element.

It has been considered inevitable that during operation of a conveyor of the kind referred to when a following carrier comes into proximity with a preceding, temporarily stationary carrier, the following carrier should be arrested suddenly rather than gradually, in order to ensure that: firstly no power drive is transmitted from the powered conveyor element through the rearmost of the two carriers to the foremost one so as to advance the foremost carrier at a time at which it is required to remain stationary; and that the rearmost of the two load carriers shall not continue to advance in such a manner as to cause damage to one or both of the carriers or to their respective loads as by collision therebetween.

The necessity suddenly to arrest the rearmost of the two successive load carriers creates a serious problem where, as is commonly the case, the load is of a substantial mass, e.g. of the order of at least 100 to 200 lbs; the problem being an especially serious one in the case where the fore and aft overall dimensions of the load are considerable, i.e. at least 6 to 10 feet. A typical example of a load having a mass and fore and aft dimension in excess of the minimum above specified is a motor car body, for the conveyance of which, e.g. in motor car body painting and assembly plants, conveyor systems of the kind referred to are commonly employed.

By reason of its mass, the suspended load has a natural tendency to swing in a fore and aft direction relative to its associated load carrier when the advancement thereof is suddenly arrested.

One effect of such fore and aft movement of a heavy suspended load, i.e. of a mass of at least 100 lbs., is to impart a substantial fore and aft movement to the associated load carrier to which drive from the conveyor element has just been discontinued. If such fore and aft movement is not restrained, it is likely to result in drive control means of the following carrier moving relative to the drive control element of the preceding carrier in such a manner as to permit undesirable engagement between a driving dog of the conveyor element and a driving dog of the following carrier.

A further effect of such fore and aft movement of the suspended load is likely to be its undesired engagement with the suspended load of an adjacent carrier with consequent damage to the two mutually engaging loads.

Such undesired engagement is particularly liable to occur when the load is both of a substantial mass and is of a considerable dimension in a fore and aft direction, for example in the case of the motor car body above mentioned.

The conveyor system which is disclosed in my prior U.S. Pat. No. 3,230,897 sought to meet the above mentioned requirements, but the design of conveyor disclosed in the aforesaid patent was inherently incapable of taking care of the natural tendency of a suspended load of substantial mass to oscillate in a fore and aft direction when the advancement of its supporting load carrier is suddenly arrested.

This is because the rear drive control member of each load carrier although formed as a buffer mounted for forward sliding movement against spring loading relative to its associated load carrier had its spring loading provided between the buffer and a bearing member for a pair of buffer supporting rollers or wheels which ran on the load carrier track, and which bearing member was connected to the rear end of the associated load carrier by a bar or tube of rigid form.

In such a construction the fore and aft length of the loading spring and thus its impact absorbing characteristics are inherently severely limited. This is because in practice the load carrier supporting track of any conveyor system invariably embodies horizontal bends of radii often as low as 3 ft. to 4 ft. Since the spring loaded buffer is supported and thus guided at its front end only, namely by the pair of rollers aforementioned, with its rear extremity entirely unsupported, if the overall length of the buffer exceeds more than about 1 foot it will foul the outer side of such horizontally curved track within which it is accommodated as described in the prior specification. Also it will, if of such a length, extend at such an inclination to the drive control member at the front of the next successive carrier as no longer effectively to engage therewith so as effectively to disconnect the drive to such successive carrier.

The loading spring necessarily has an overall length less than that of the buffer element as can be seen from FIG. 4 of my prior U.S. Patent, so that even with this unacceptable long length of buffer element, its impact absorbing characteristics are inherently limited.

SUMMARY OF THE INVENTION

The present invention has for its object the provision of an improved arrangement by which the above specified disadvantages are avoided.

According to the present invention a drive control element of a load carrier in a conveyor of the kind referred to is mounted on a supporting body carried on wheels which run on the load supporting track, the supporting body is connected by a connecting element to a body of the load carrier for articulation relative thereto so that the supporting body and drive control element thereof can be guided by said wheels around horizontally curved portions of track, said supporting body is spaced in the fore and aft direction from the body of the load carrier, the connecting element permits relative fore and aft movement of said supporting body and the body of the load carrier, and there is interposed between said supporting body and the load carrier resilient damping means for damping said relative fore and aft movement.

By arranging the resilient damping means between the supporting body for the drive control member and the body of the load carrier, and by articulating the supporting body to the body of the load carrier, the impact absorbing characteristics of the damping means can be made as great as required whilst avoiding the difficulties in so doing with an arrangement according to my prior U.S. Patent aforementioned. For example, the damping means may comprise a helically-coiled spring arranged with the spring axis extending in the fore and aft direction, and the length of this spring can without difficulty be made large enough to meet the requirements hereinbefore specified.

DESCRIPTION OF THE PREFERRED EMBODIMENT

The conveyor system illustrated in the drawings is similar to that of U.S. Pat. No. 3,230,897 to which reference should be made and includes a conveying element in the form of an endless power advanced conveyor chain 7 supported by rollers from chain track 8. As shown by the arrow in FIG. 1 the direction of advancement of the conveyor chain is from right to left.

Figure 3:
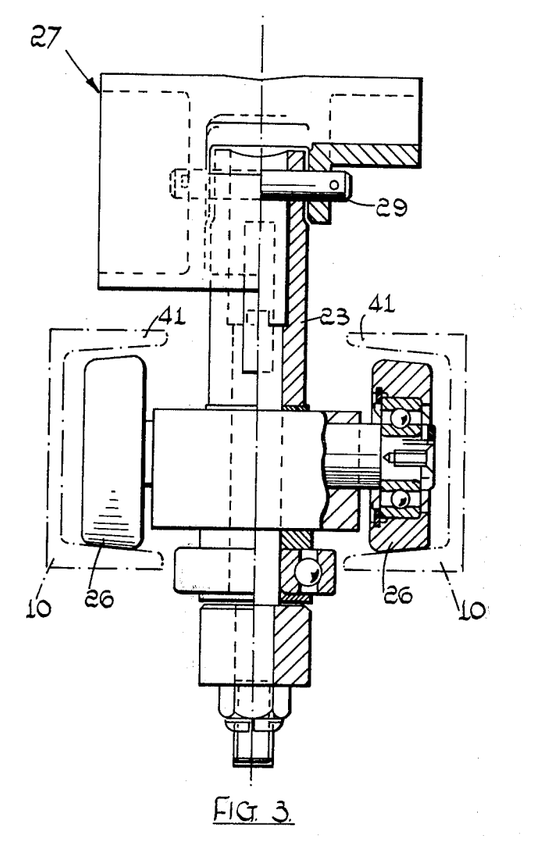
FIG. 3 is a sectional view to a larger scale on the line 3—3 of FIG. 1.

The conveyor chain 7 has fixed thereto at intervals along its length dependent driving dogs 9. Disposed vertically beneath the chain and extending parallel thereto is a load carrier supporting track 10 formed as shown in FIG. 3 by a pair of oppositely facing channel-section rails.

On the track 10 there are mounted a number of load carriers 11 each comprising a pair of load supporting wheeled trolleys namely front trolley 12 and rear trolley 13 connected together, so as to be spaced apart in a fore and aft direction, by draft bar 14. Each of these trolleys 12, 13 is constructed as described in U.S. Pat. No. 3,230,897 except for the omission of any chain driving dog engaging shoes.

The load supporting trolleys 12, 13 have pivoted thereto at 15 dependent suspension hooks 16 which engage suspension eyes 17 pivoted at 18 to load carrying assembly 19 formed in the known manner from a number of connected together bars so arranged so as to support a motor car body 20. The construction permits of the body 20 swinging in a fore and aft direction about the suspension pivots 15 and 18 and also of the bars of the assembly 19 about pivots 21, all of which pivots have their axes extending horizontally transversely to the direction of load carrier advancement.

Thus when an advancing load carrier is arrested, the momentum of the load, i.e. the motor car body 20 is dissipated by fore and aft swinging of the load which is minimised by the resilient damping means of this invention as later described.

In advance of the front trolley 12 and to the rear of the rear trolley 13 of each load carrier is respectively a front and rear drive control member supporting body 22, 23 and connected to the adjacent trolley 12, 13, respectively, by corresponding connecting elements 24, 25, each in the form of a metal tube. The control member supporting bodies are each formed as wheeled trollies similar to the trollies of the prior specification last mentioned, so as in the case of the trollies 12, 13 to embody track engaging wheels or rollers 26.

Each front control member supporting body 22 of each load carrier is of plate-like form and of rectangular shape in side elevation.

Driving shoes 27 and retarding shoes 28 are pivotally connected respectively to the front and rear upper corner of the rectangular-shaped front control member supporting body 22 by transverse pivot pins 29 at a position intermediate the front and rear ends of the shoes.

Figure 1:
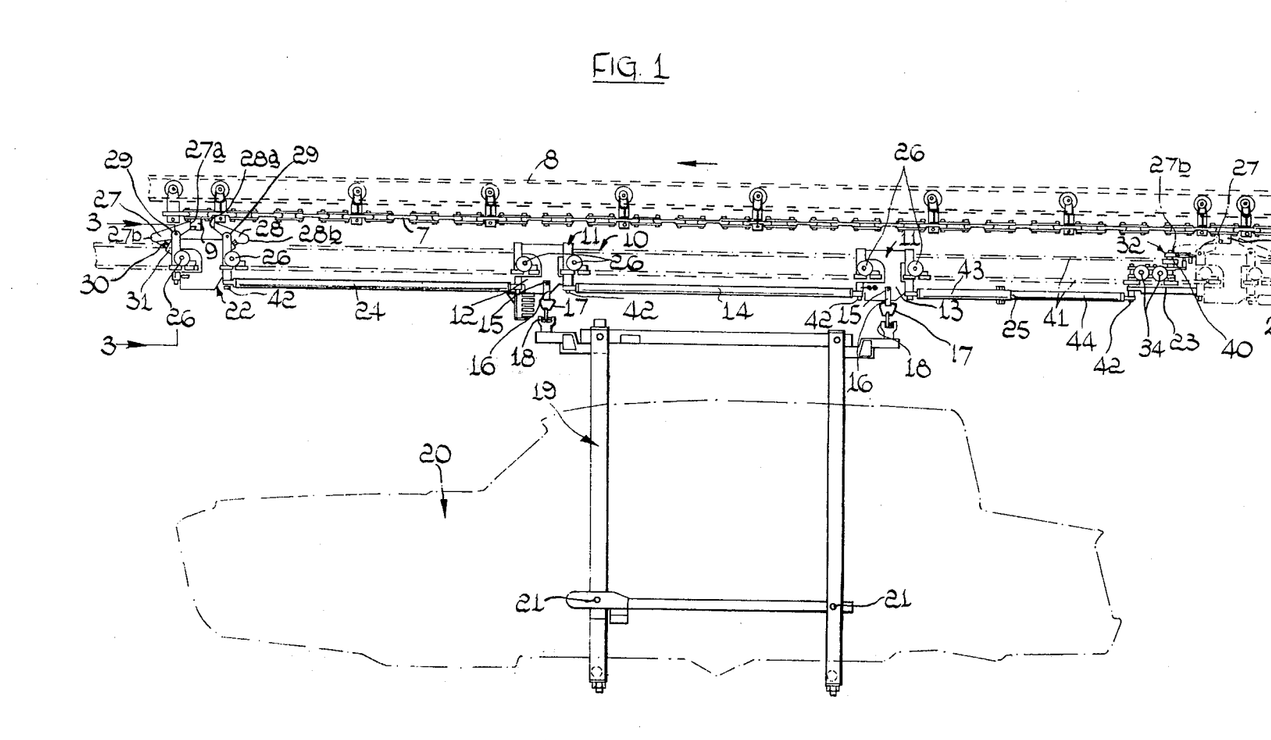
FIG. 1 is a side view of part of one form of conveyor system embodying the invention and depicting one of the load carriers thereof with its front and rear drive control members.
Figure 2:
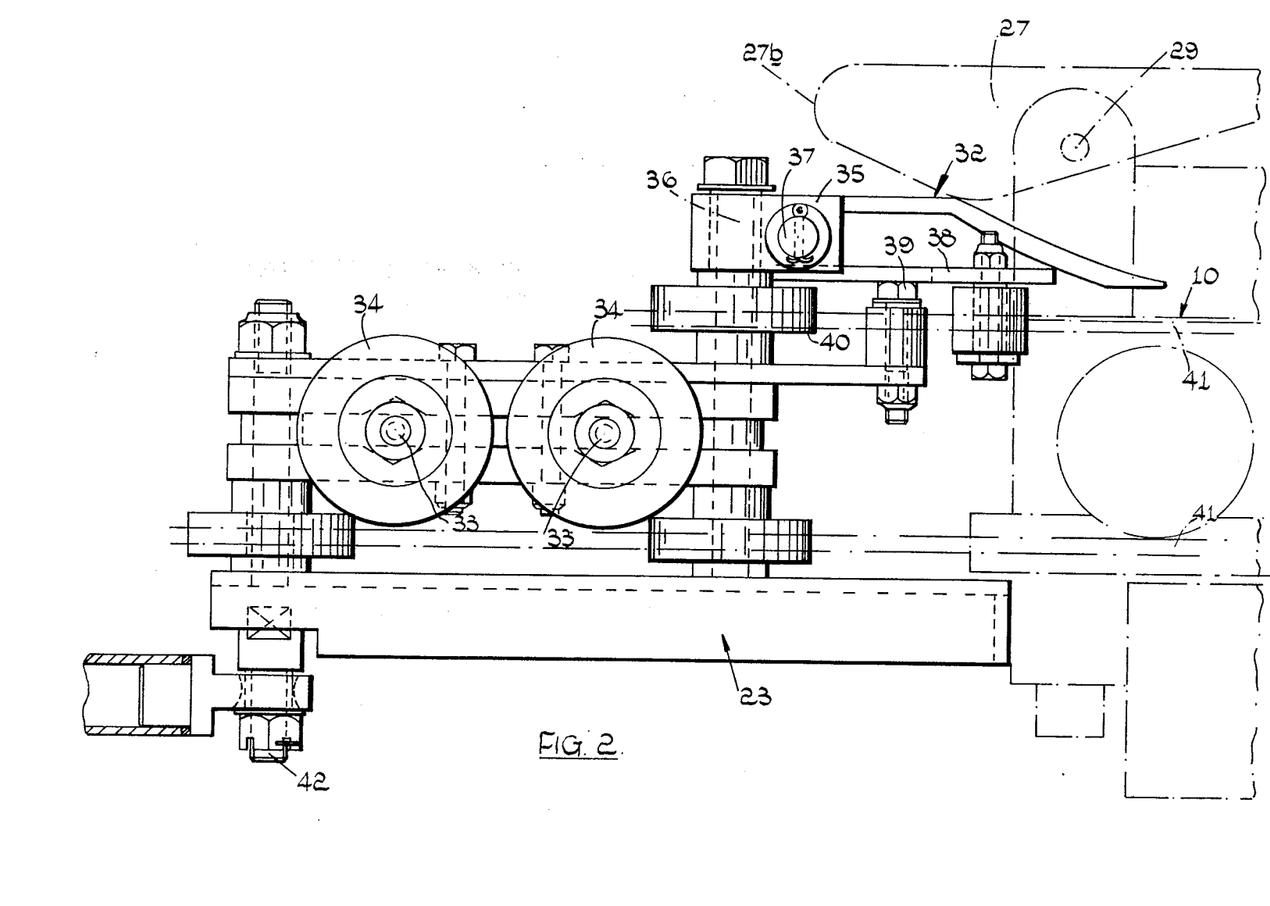
FIG. 2 is a side view to a larger scale of part of the conveyor system of FIG. 1 illustrating the interengagement between two drive control members of successively advancing load carriers.

The two shoes 27 and 28 of the body 22 are respectively gravitationally loaded about their respective pivots into the inclined operative or dog engaging positions as shown in FIG. 1 in which the rear end face 27a of the driving shoe 27 is adapted for driving engagement with the front face of a driving dog 9 and the front end face 28a of the retarding shoe 28 is adapted to engage with the rear side of the driving dog 9 to prevent the trolley overrunning the dog 9 and chain 7. Such gravitational loading of the trolley shoes 27 and 28 is obtained by making the front end portion 27b of driving shoe 27 and the rear end portion 28b of retarding shoe 28 of solid configuration in cross-section. The so weighted portions of each shoe are adapted on their undersides to engage with the heads of adjustable screws 30 which are in threaded engagement with blocks 31 fixed to the trolley body 22. The screws 31 thus serve to limit the pivotal movement of the shoes under their gravitational loading so that, in their respective operative positions as shown in FIG. 1, the upper side of the driving shoe 27 is inclined upwardly in a rearward direction over the whole of its entire length while the upper side of each retarding shoe 28 is similary upwardly inclined but in a direction forwardly of the trolley.

The arrangement is such that each trolley shoes 27, 28 can be pivoted about its respective pin 29 into a substantially horizontal disengaged position so as to bring the rear end of the driving shoe 27 and the front end of the retarding shoe 28 below the underside of the adjacent driving dog on the chain. A driving dog can thus advance relative to a trolley into the driving position by engaging with the upper side of a retarding shoe 28 and swinging this temporarily against its gravitational loading into a horizontal position.

Such pivotal movement of the driving shoe 27 into its disengaged position is effected by engagement of the underside of the front portion 27b of the driving shoe, which front portion 27b constitutes a front drive control member, by the rear drive control member 32 on the rear control member supporting body 23 of a preceding load carrier.

Figure 4:
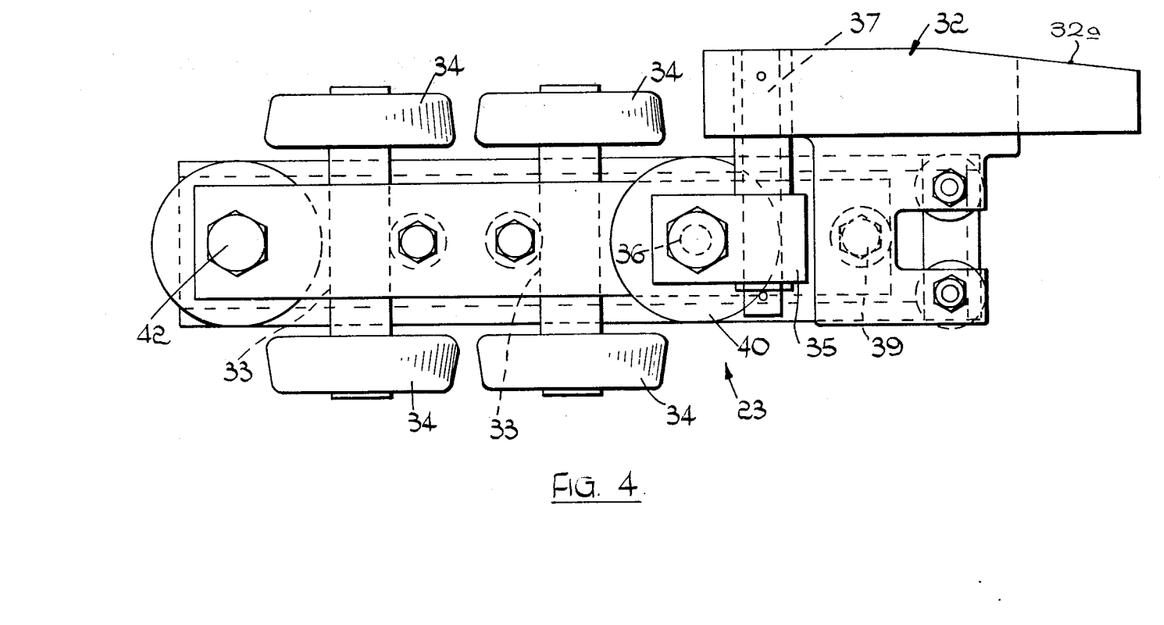
FIG. 4 is a plan view of the parts shown in FIG. 2.

As shown in FIG. 4, the rear control member supporting body 23 carries a pair of transverse horizontal spindles 33 on each end of each of which is mounted a track-engaging roller 34. A swivel block 35 is pivotally connected to the body 23 by means of a pivot pin 36 which also carries a track engaging guide roller 40 and the swivel block 35 provides a pivotal mounting for the drive control member 32 which is in the form of a driving shoe displacing member pivotable about the transverse horizontal axis of a pin 37 relative to the block 35 which is in turn pivotable about a vertical axis, i.e. that of the pin 36 relative to the rear drive control member supporting body 23.

As described in the prior U.S. Pat. No. 3,230,897, the drive control member 32 is elongated in a fore and aft direction and extends rearwardly from the pivot pin 37 and includes a part 38 which bears on the head of a bolt 39 mounted on body 23 and carries a pair of guide rollers 40 which engage the upper flanges 41 of the trolley track 10. The method of pivotal connection between the control member 32 and its supporting body 23 is such that, irrespective of track irregularities or the traversing of bends in the trolley track, the rear end portion 32a of the rear drive control member 32 will always occupy a designed position in relation to the trolley track so as to be in the correct position to engage with the front drive control member of the next following load carrier namely with the underside of the front end portion 27b of the driving shoe 27 on the front drive control member supporting body 22 of such following load carrier.

To facilitate engagement of the member 32 with the driving shoe 27, the upper surface of the member 32 is inclined downwardly to the horizontal in a rearward direction so as to be adapted to have wedging engagement with the underside of the front end of the driving shoe of the next following driving trolley.

When by the continued advancement of the following trolley, the member 32 engages with such trolley driving shoe 27 this will be swung out of engagement with a previously engaged driving dog so as to be in a horizontal position shown at the right-hand side of FIG. 1. In order to allow for relative transverse movement between each drive control member 32 and each trolley driving shoe 27 consequent on the trolley track being sharply curved in a horizontal sense, the front end of each trolley driving shoe 27 is made relatively wide (see FIG. 3) so as to have a width substantially equal to that of the trolley track.

Each driving shoe 27 can thus be square or rectangular configuration as viewed in plan and this relatively substantial width provided also contributes to the required gravitational loading which in the case of both shoes can also be ensured by disposing the shoe pivot nearer to the rear than the front end in the case of the driving shoe 27 and nearer to the front than the rear end in the case of the retarding shoe 28.

Each of the load supporting trolleys 12, 13 is articulated both to the corresponding end of the draft bar extending therebetween and also to the adjacent end of the connecting element 24, 25 respectively, the opposite end of which element is articulated to the corresponding control member supporting body 22, 23. The articulation is provided in each case by vertically extending pivot pins 42 which in the manner described in U.S. Pat. No. 3,230,897 permit of relative lateral movement as well as some relative vertical movement between the two trolleys 12, 13 as well as between the latter and their associated control member supporting bodies. Thus the drive control member 27b is free to swing with its supporting body not only in a vertical sense but laterally relative to the associated load carrier in traversing horizontal curved portions of the track and can thus be maintained in a position substantially medially of the width of the load carrier track in addition to being maintained in the optimum position for engagement with the adjacent drive control member of the next proximate load carrier. The drive control member 32 is free to swing laterally relative to its supporting body 23, which body is free to swing relative to the associated load carrier both laterally and vertically.

In the arrangement illustrated, the resilient damping means is provided in the connecting element 25 between the rearmost load carrying trolley 13 and the rearmost drive control member supporting body 23.

For this purpose, the tube forming the connecting element 25 is made of a substantial length, i.e. several feet and desirably between 4 to 6 feet in length to enable it to provide accommodation for resilient damping means of sufficiently large momentum absorbing capacity.

Figure 5:
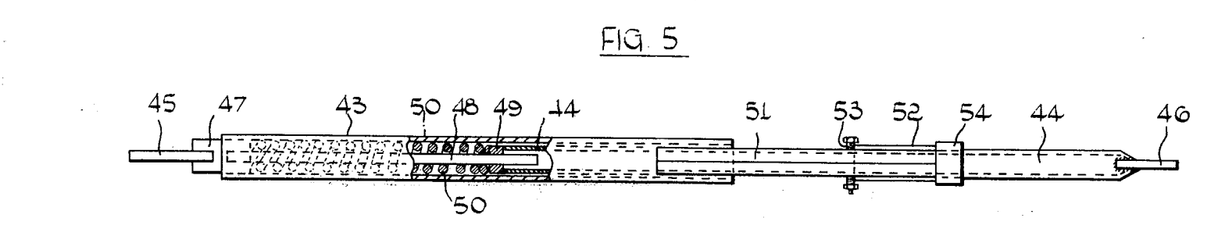
FIG. 5 is a part-sectional side view to a larger scale than FIG. 1 of one of the drive control member connecting elements and associated resilient damping means of the load carrier depicted in FIG. 1.

The tube forming the connecting element 25 is of telescopic construction comprising as shown in FIGS. 1 and 5, an outer tube 43 which extends rearwardly from the rear load carrier trolley 13 and an inner tube 44 mounted for sliding movement in a fore and aft direction within the outer tube 43 and projecting rearwardly therefrom. Also for the purpose last described the outer tube is itself made of substantial length, i.e. between about 2.5 to 4 feet for the connecting element length above specified. It will also be seen from FIG. 1 that the connecting element 24 is a one piece element and is therefore of fixed length.

The two tubes 43, 44 have secured to their respective outer ends connector lugs 45, 46 having holes for articulating them through one of the pivot pins 42 to the rear load carrying trolley 13 and rear control member supporting body 23.

The connector lug 45 at the outer end of the outer tube 43 is carried by one end of a collar 47 secured within said end of tube 43, the collar 47 having fixed therewithin one end of a spring guide rod 48 which extends coaxially within the outer tube 43 rearwardly thereof. This rod in the example above quoted has an overall length of between about 2 to 3 feet. The rear end portion of the rod 48 is axially slidable within a bush 49 carried on the inner, i.e. front end of the inner tube 44.

The opposed faces of the collar 47 and bush 49 constitute abutments for helically coiled compression spring 50 acting therebetween and disposed around the rod 48, which spring constitutes the resilient damping means aforementioned.

By reason of the substantial length of the connecting element 25 and its associated outer tube 43, the damping spring 50 is made of a corresponding substantial length e.g. of between about 1½ and 2 feet when unstressed, in the example above quoted, which is very considerably longer than the maximum length possible with the buffer spring of the arrangement according to the prior specification first mentioned as earlier explained herein.

Accordingly the damping spring 50 is inherently capable of absorbing a substantial part of the momentum possessed by the above described load of substantial mass when the advance of the associated load carrier is arrested, namely by the stressing of the compression spring 50 from an initial length of the order of about 1½ to 2 feet as already mentioned to a fully compressed length of the order of 1 foot to 1½ feet corresponding to a spring compression distance of about 6 inches as the inner tube 44 telescopes within the outer tube 43.

Figure 6:
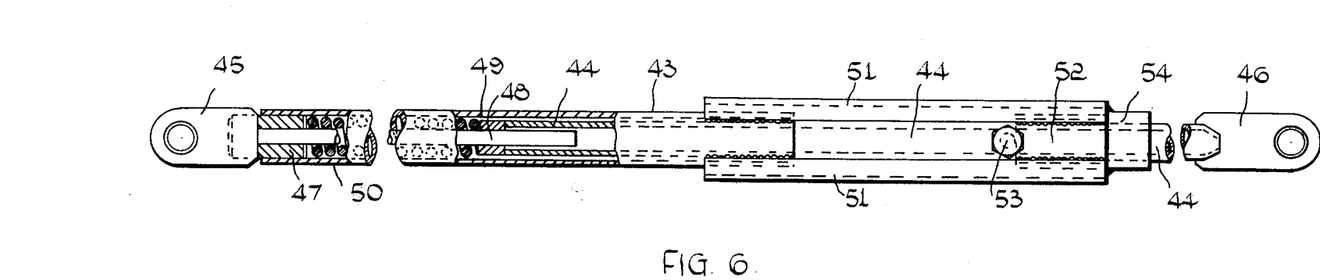
FIG. 6 is a part-sectional plan view to a still larger scale of part of the connecting element shown in FIG. 5.

Outward movement of the inner tube 44 away from the outer tube 43 by a distance sufficient to disengage bush 49 from the adjacent end of guide rod 48 is prevented by connecting the inner end of the telescopic outer tube 43 through a pair of spaced apart angle bars 51 (see FIG. 6) to a sleeve 52 in which slides the adjacent part of the inner tube 44. The latter carries a stud 53 which is engageable both with the inner end of the sleeve 52 and the inner end of the outer tube 43 to limit both the outward movement of tube 44 as well as to prevent over compression of spring 50.

For convenience in construction, the sleeve 52 is supported at its outer end from a collar 54 which connects together the two angle section bars 51 between which the inner tube is free to move in a fore and aft direction to the extent permitted by the stud 53.

The arrangement is such that the stud 53 is normally in engagement with the adjacent end of sleeve 52 under an initial pre-loading of the loading of spring 50.

In operation, with the above described construction, when the following of two successive load carriers advances into proximity with the preceding one of the two load carriers and which is at present stationary, the front drive control member of the following load carrier namely portion 27b of shoe 27, will impact against the upper side of the shoe displacing member 32 of the preceding load carrier. Thus the member 32 together with its wheeled supporting body and which is connected to the said inner tube 44 will be urged forwardly relative to the outer tube 43, compressing damping spring 50 in so doing to the extent permitted by the spring, i.e. through a distance of the order of 6 inches.

Thus this following load carrier will be caused to come to rest relatively gradually over a distance of the order of some 6 inches rather than being brought abruptly to rest. During such deceleration, the damping spring 50 will serve to absorb a substantial part of the momentum of the following load carrier and associated load.

As a result, not only will the extent of the pendulum movement of the load suspended from the just arrested carrier be substantially reduced with consequent substantial reduction in the likelihood of this impacting against the stationary load of the preceding carrier, but there will also be much less likelihood of the pendulum motion of the suspended load of the just arrested carrier being of sufficient magnitude as to cause the just arrested carrier now to move rearwardly by a distance, i.e. of the order of at least six inches in the example specified, enough to permit of the shoe displacing member 32 of the preceding carrier being disengaged by the front portion 27b of the driving shoe 27 of the following carrier so as to permit of its driving shoe returning to its driving position and thus being undesirably engaged by the next advancing conveyor chain dog 9.

Although it is preferred to provide the resilient damping means between load carriers and their rear drive control members, i.e. shoe displacing member 32, as this arrangement avoids stressing the telescopic connecting element when negotiating inclined portions of the track and enables the load carrier to be accurately positioned by means of the shoes 27 and 28, the resilient damping means may instead be provided between the front load carrier trolley 12 and its front drive control member. This would by done by making the connecting element 24 of telescopic tubular construction as already described for the element 25 with the outer tube 43 then articulated to trolley 12 and the inner tube 44 articulated to the wheeled front supporting body 22, and housing spring 50.

With either arrangement, the damping spring 50 would be so pre-loaded as to provide such initial resistance to telescoping movement between the two tubes 43 and 44, and the spring force, which must be overcome before this can occur that:

a. In the arrangement illustrated, the shoe displacing member 32 at the rear of the preceding load carrier displaces the driving shoe 27 of the following carrier into its disengaged position before the shoe displacing member 32 and its associated supporting body 23 start to move forwardly relative to their associated rear load-carrying trolley 13.

b. In the modification just described in which the damping means is at the front of its load carrier the shoe displacing member 32 of the preceding carrier causes displacement into the disengaged position of the driving shoe 27 of the following carrier before such driving shoe starts to move rearwardly relative to the front load-carrying trolley 12 of such following carrier.

If desired, the damping action of the spring 50 may be assisted by providing some form of frictional damping means arranged to resist the relative axial movement of the two tubes 43, 44.

The conveyor system is provided with control means for arresting a first load carrier at a selected work station and for releasing the arrested carrier when so desired and such control means can be as disclosed in U.S. Pat. No. 3,230,897.

I claim:

1. In a conveyor system comprising:
   a. an endless power-driven conveyor element having a plurality of driving dogs spaced from one another lengthwise of the element,
   b. a load-supporting track extending parallel to the path of travel of the conveyor element,
   c. a plurality of load carriers which run on the track, each load carrier comprising a trolley having a body mounted on wheels which run on said track,
   d. a first drive control element at the front end of each load carrier,
   e. a second drive control element at the rear end of each load carrier for co-operation with the first drive control element of a following carrier when such following carrier comes into proximity with a preceding carrier,
   f. a supporting body supporting one of said drive control elements, spaced lengthwise of the track from the load carrier and mounted on wheels which run on the track,
   g. a connecting element articulately connecting said supporting body with said body of the load carrier,
   h. drive transmitting means associated with each load carrier for releasably engaging with a driving dog of the conveyor element to transmit drive from the conveyor element to the load carrier, said drive transmitting means being releasable from engagement with a driving dog of the conveyor element by co-operation of the first drive control element of the associated load carrier with the second drive control element of a preceding load carrier, the improvement wherein:

i. said supporting body is spaced lengthwise of the track from the drive transmission means of the load carrier, j. said connecting element is contractable to permit relative movement of said supporting body and said body of the load carrier in a direction lengthwise of the track, k. said connecting element comprises two members relatively slidable in the fore and aft direction, l. one of said members is articulated to the supporting body, m. the other of said members is articulated to said body of the load carrier, and n. resilient damping means for damping said relative movement is interposed between said supporting body and said body of the load carrier, o. said resilient damping means comprises a helically coiled spring whereof opposite end portions are connected with respective ones of said members, whereby when a following load carrier carrying a load comes into proximity with a preceding, stationary, load carrier, a substantial part of the momentum of the load is absorbed by said damping means.

2. The improvement according to claim 1 wherein said supporting body is spaced rearwardly from the load carrier, the second drive control element is mounted on said supporting body and the drive transmitting means is situated adjacent to the front end of the load carrier.

3. The improvement according to claim 1 wherein said drive transmission means is a part of a driving shoe which forms said first drive control element and is mounted for pivoting movement between driving dog engaging and driving dog dis-engaging positions.

4. The improvement according to claim 1 wherein, when said connecting element is extended to its maximum length, said spring is subjected to pre-stress, whereby the connecting element will contract only when subjected to a force exceeding the prestress in the spring.

5. In a conveyor system comprising:

a. an endless power-driven conveyor element having a plurality of driving dogs spaced from one another lengthwise of the conveyor element, b. a load-supporting track which extends parallel to the path of travel of said conveyor element, c. a plurality of load carriers which run on said track and each of which has drive transmitting means for releasable engagement with a driving dog of the conveyor element to transmit drive therefrom to the load carrier, d. each load carrier comprises a pair of load-supporting trolleys connected together in spaced relation in a direction lengthwise of the track, and a pair of drive control element-supporting trolleys spaced one forwardly of and one rearwardly of the pair of load-supporting trolleys, e. first and second drive control elements are mounted on respective ones of said drive control element-supporting trolleys, f. each load carrier further comprises a connecting element articulately connecting said first drive control element-supporting trolley to the adjacent load-supporting trolley and a further connecting element articulately connecting said second drive control element-supporting trolley to the adjacent load-supporting trolley, the improvement wherein:

g. said drive transmitting means is mounted on said first drive control element-supporting trolley, h. said connecting element is of fixed length, whereby the distance between said first drive control element-supporting trolley and the adjacent load-supporting trolley is constant, and i. said further connecting element includes two tubes slidable one within the other telescopically and a coiled compression spring acting between the two tubes for biasing the tubes to a predetermined relative position.

6. The improvement according to claim 5 further comprising a guide rod disposed within said tubes and fixed with respect to one of the tubes, and abutments on each of the two tubes, said spring surrounding said guide rod and acting between said abutments.

7. The improvement according to claim 6 wherein the distance between said abutments when the further connecting element is extended to its maximum length is less than the natural length of the spring, whereby the spring is subjected to pre-stress.

* * * * *